(12) United States Patent
Manning et al.

(10) Patent No.: US 11,873,932 B2
(45) Date of Patent: Jan. 16, 2024

(54) PIPE JOINT

(71) Applicants:John Patrick Manning, Norwich (GB); Henry Mitchell, Burnley (GB)

(72) Inventors: John Patrick Manning, Norwich (GB); Henry Mitchell, Burnley (GB)

(73) Assignee: MMC FITTINGS LIMITED, Macclesfield (GB)

( * ) Notice: Subject to any disclaimer, the term of this patent is extended or adjusted under 35 U.S.C. 154(b) by 779 days.

(21) Appl. No.: 16/344,483

(22) PCT Filed: Oct. 25, 2016

(86) PCT No.: PCT/GB2016/053324
§ 371 (c)(1),
(2) Date: Apr. 24, 2019

(87) PCT Pub. No.: WO2018/078309
PCT Pub. Date: May 3, 2018

(65) Prior Publication Data
US 2020/0056731 A1 Feb. 20, 2020

(51) Int. Cl.
*F16L 37/14* (2006.01)
*F16L 17/035* (2006.01)

(52) U.S. Cl.
CPC ........... *F16L 37/148* (2013.01); *F16L 17/035* (2013.01)

(58) Field of Classification Search
CPC ....... F16L 37/148; F16L 37/142; F16L 21/08; F16L 37/098; F16L 37/0985
(Continued)

(56) References Cited

U.S. PATENT DOCUMENTS

| 400,949 | A | * | 4/1889 | Riley | ................. F16L 37/0985 285/285.1 |
| 2,458,714 | A | | 1/1949 | Mahoney | |

(Continued)

FOREIGN PATENT DOCUMENTS

| GB | 1277385 | | 6/1972 | |
| GB | 1382348 | A * | 1/1975 | ............ F16L 37/148 |

(Continued)

OTHER PUBLICATIONS

European Patent Office, International Preliminary Report on Patentability, App. No. PCT/GB2016/053324 (dated Jan. 30, 2019).

*Primary Examiner* — Matthew Troutman
*Assistant Examiner* — Fannie C Kee
(74) *Attorney, Agent, or Firm* — Walters & Wasylyna LLC

(57) ABSTRACT

A pipe joint for joining pipe sections via a receiving recess at one end of the first pipe section including a first groove formed in an internal wall of the receiving recess and accessible via a transverse insertion passage, a plurality of axially spaced-apart second grooves formed in an external wall of a connection end of the second pipe section, and an elongate flexible anchoring strip including a plurality of axially spaced-apart anchoring portions placeable in respective ones of the second grooves, wherein, once the first and plurality of second grooves have been brought into alignment upon insertion of the connection end of the second pipe section into the receiving recess, the anchoring strip is inserted from outside the first pipe section into the first groove and plurality of second grooves so as to be seated therein, thereby uniting and axially locking together the first and second pipe sections.

21 Claims, 3 Drawing Sheets

(58) Field of Classification Search
USPC .......................................................... 285/321
See application file for complete search history.

(56) References Cited

U.S. PATENT DOCUMENTS

| | | | | |
|---|---|---|---|---|
| 3,148,897 | A * | 9/1964 | Hurt | F16L 37/148 285/98 |
| 3,334,929 | A | 8/1967 | Wiltse | |
| 3,920,270 | A * | 11/1975 | Babb, Jr. | F16L 21/022 285/104 |
| 4,111,464 | A * | 9/1978 | Asano | F16L 47/12 285/111 |
| 4,557,508 | A * | 12/1985 | Walker | E21B 33/038 285/84 |
| 4,643,466 | A * | 2/1987 | Conner | F16L 37/0927 285/321 |
| 4,749,192 | A * | 6/1988 | Howeth | F16L 37/148 285/305 |
| 4,817,996 | A * | 4/1989 | Fouts | F16L 37/148 285/305 |
| 4,830,408 | A * | 5/1989 | Reimert | E21B 17/046 285/27 |
| 4,863,199 | A * | 9/1989 | Hojo | F16L 37/505 285/232 |
| 5,115,836 | A * | 5/1992 | Carow | F16L 37/148 137/614.04 |
| 6,302,445 | B1 * | 10/2001 | Kugele | F16L 37/148 285/376 |
| 6,343,813 | B1 | 2/2002 | Olson et al. | |
| 6,352,288 | B1 | 3/2002 | Calkins | |
| 7,270,348 | B2 * | 9/2007 | Parrott | F16L 37/148 285/308 |
| 2007/0246936 | A1 | 10/2007 | Jeltsch | |
| 2013/0069366 | A1 | 3/2013 | Morrison et al. | |
| 2015/0308595 | A1 | 10/2015 | Lee | |

FOREIGN PATENT DOCUMENTS

| | | | |
|---|---|---|---|
| GB | 2464672 | 4/2010 | |
| GB | 2537883 | 11/2016 | |
| GB | 2540016 | 1/2017 | |
| WO | WO-2013128395 A2 * | 9/2013 | ............ F16L 37/252 |
| WO | WO 2014/049375 | 4/2014 | |

\* cited by examiner

PIPE JOINT

This application is a U.S. national phase application of Intl. App. No. PCT/GB2016/053324 filed on Oct. 25, 2016, the entire contents of which are incorporated herein by reference.

TECHNICAL FIELD

This invention relates to a joint for pipes and other conduits. More particularly, though not exclusively, the invention relates to a joint for joining together plural lengths of pipe or other conduit, for example in the forming of a fluid transport system.

BACKGROUND AND PRIOR ART

As used herein the term "pipe" is to be construed broadly, and is to be understood as encompassing any form, shape and size of conduit, particularly a tubular conduit. Indeed the terms "pipe" and "conduit" may be used interchangeably herein. Such pipes or conduits to which the invention may be applied may in particular include pipes or conduits having any suitable or desired cross-sectional size (e.g. diameter) and/or longitudinal length.

Fluid transport systems are well-known for conveying flowable materials such as liquids and gases, with common examples including water and fuels, for example gas and oil. Such systems may include oil and gas pipelines for conveying fuel over large distances, even thousands of miles. The tubular conduits commonly used in fluid transport of fuel may be made of various metals, including steel, iron, copper or aluminium, or of various plastics materials. Typically pipelines are made by joining together individual lengths of pipe end-to-end using a suitable joint or jointing system.

For small bore plastic pipes a press- or screw-fit joint can often be used, as that form of joint is often sufficient in that context. On the other hand, for small bore copper pipe the use of soft solder is the usual means of joint connection.

For larger diameter pipes, e.g. typically from around 1 to around 1.5 metres (around approximately 40 to 60 inches) in diameter, which is the size of pipe typically used in the transport of fuel via pipelines over large distances, welded joints are commonly used. However, welded joints have a disadvantage of requiring skilled workers to form them, as well as having negative health and safety and environmental implications. For example, the construction of gas or oil conveying pipelines, which are typically made from approximately 12 metre (approximately 40 feet) long lengths of steel pipe with a diameter of around 1 to 1.5 metres (around approximately 40 to 60 inches), conventionally use welded joints. Each joint can typically take a skilled team a whole day to make, taking into consideration the deployment of the necessary equipment at the joint location and the subsequent inspection and/or testing of the completed joint such as by use of X-ray equipment. Also, around 1 in 10 of such welded joints typically may need some repair after such inspection. All this makes oil and gas pipelines particularly expensive and time consuming to construct and maintain.

A further problem with both press-fit and welded joints is that they are difficult to disconnect, for example for repair or maintenance, and once disconnected they are generally not re-useable. Furthermore, disconnection of press-fit or welded joints often results in damage to the pipe lengths themselves.

In an effort to address the above problems, there are known various designs of pipe joint which work on the principle of joining a pair of pipe lengths together via a male-female joint in which a resiliently flexible elongate wire or spring is inserted through a channel in the joint wall into mutually opposed grooves in the respective inner and outer pipe walls to be jointed once the grooves have been brought into register with each other, thereby securing the pipe lengths together in an axial direction.

However, in practice such joints have limited efficacy and longevity, in particular when the jointed pipe lengths are subjected, as is common in many fluid transport systems, to high internal fluid pressures and/or repeated pressure pulsing of the pumped fluid. In such cases a new problem which occurs over time is that wear occurs of the material defining and surrounding the grooves in the respective pipe walls, which leads to reductions in the wall thicknesses at the groove sites, which ultimately can lead to failure of the pipe walls themselves in the vicinity of the joint. This problem is exacerbated by the increasingly attractive move away from steel pipes and towards using pipes made of plastics materials, which often may not be as hard, tough or hard-wearing as steel, especially when used in conjunction with metal jointing wires. A further problem is that repetitive strain of the flexible elongate jointing wire itself used to form the joint leads to weaknesses in the wire itself, which can thus lead to failure of the sole means which axially secures the pipe lengths together, which again can lead to failure of the overall joint.

It is not a practical solution to the above problems simply to employ thicker pipe walls and/or thicker jointing wires, because this would be very uneconomical, not only from the point of view of requiring greater amounts of materials with increased weight, bulk and cost, but it would also reduce the internal volume of, and thus fluid-carrying capacity of, the pipe. And in any event this would by no means be a complete, efficient or long-term solution to the underlying problem of joint component wear, since such would still occur under commonly encountered high pressures and pulsed pressure loadings of the joint under typical working conditions.

Furthermore, it is also not a practical solution to the above problems to simply employ a "double-joint" (or even a "triple-" or "quadruple-" etc joint), in which two or more like wire-in-grooves type joints, axially spaced apart a short distance, each based on a respective resiliently flexible elongate wire inserted into a respective pair of mutually opposed grooves in the pipe walls to be jointed, are employed in an attempt to axially spread and thus reduce the axial loadings that occur on each joint. This is because the typical practical engineering tolerances in the accuracy of the axial positioning of such plural sets of grooves in the respective pipe walls (especially over their entire circumference and as between different pipe sections) that such an arrangement would demand in order to work properly would be generally too great. Unless the respective sets of alignable grooves carrying the respective wires were to be precisely placed such that they would each begin to absorb axial load at precisely the same time, then one of the joints would always begin to absorb load before the other begins to take up some of that load, resulting in one of the joints always still bearing substantially full load over at least a significant portion of any loading or pressure pulsing period or cycle. This would therefore defeat the underlying object of spreading load between the plural joints, and would still be a particular problem in the case of repetitive pulsed loadings. Attempting to reduce engineering tolerances in order to address this issue is not a practical option, since that would place too great a demand on typical pipe manufacturing techniques and machinery, and would if anything, even if achievable to an acceptable degree in principle (which is technically unlikely), lead to unacceptably increased levels of cost.

It is therefore a primary object of this invention to address the above problems and shortcomings of known pipe joints and to provide a novel form of pipe joint which is quick and easy to assemble or deploy, likewise efficient to disassemble or disconnect whilst maintaining the integrity and re-usability of the pipe lengths, and furthermore is able to spread and thus reduce axial loadings experienced by components of the pipe joint during use and thus to reduce wear of joint components.

SUMMARY OF THE INVENTION

Aspects of the present invention provide a pipe joint, a kit of parts for use in joining together at least two lengths of pipe, an elongate flexible anchoring element for use in forming a pipe joint, a method of joining together at least two lengths of pipe, and a pipe or pipeline formed from a plurality of pipe sections in which adjacent sections are joined together using the joint or the anchoring element or by the jointing method.

In a first aspect of the present invention there is provided a pipe joint for joining a first conduit section to a second conduit section, the first conduit section having at least one first connection end comprising a wall defining a receiving recess for receiving a second connection end of the second conduit section, wherein the joint comprises:
  at least one first groove or channel formed in one of an internal surface of the wall of the receiving recess of the first conduit section or an external surface of the second connection end of the second conduit section;
  a plurality of second grooves or channels formed in the other of the internal surface of the wall of the receiving recess of the first conduit section or the external surface of the second connection end of the second conduit section, the plurality of second grooves or channels each being axially spaced apart from one another, the or each first groove or channel and the plurality of second grooves or channels being accessible from the outside of at least the first conduit section; and
  an elongate flexible anchoring element comprising a plurality of anchoring portions axially spaced apart from one another and joined by a bridging portion therebetween, the anchoring and bridging portions being configured such that each anchoring portion is placeable in a respective one of the said second grooves or channels,
  wherein the elongate flexible anchoring element is inserted into the at least one first groove or channel and the plurality of second grooves or channels so as to be seated in and between both the said at least one first groove or channel and the plurality of second grooves or channels when they have been brought into register or alignment upon insertion of the second connection end of the second conduit section into the receiving recess of the first conduit section,
  whereby upon said insertion and seating of the anchoring element into and between the in-register or aligned at least one first groove or channel and the plurality of second grooves or channels, with the anchoring portions of the anchoring element seated in the said second grooves or channels, the first and second conduit sections are united so as to be axially substantially immovable relative to each other.

In some practical embodiments of the above first aspect the pipe joint may be in an "as formed" (or "when formed") condition, i.e. in which the joint has already been made, wherein the second connection end of the second conduit section has already been inserted into the receiving recess of the first conduit section such as to bring into register or alignment the respective first and plurality of second grooves or channels, and the elongate flexible anchoring element has been inserted into and between the in-register or aligned first and plurality of second grooves or channels so as to be seated therein and therebetween, thereby uniting the first and second conduit sections so as to be axially substantially immovable relative to each other.

However, in other embodiments of the above first aspect the pipe joint may be provided in the form of a kit of parts for, and prior to, forming the said joint. Accordingly, and in accordance with a second aspect of the invention, there is provided a kit of parts for forming a joint between a first conduit section and a second conduit section, wherein the said kit comprises:
  the said first conduit section and the said second conduit section,
    wherein the first conduit section has at least one first connection end comprising a wall defining a receiving recess for receiving a second connection end of the second conduit section,
    and wherein one of an internal surface of the wall of the receiving recess of the first conduit section or an external surface of the second connection end of the second conduit section has formed therein at least one first groove or channel, and the other of the internal surface of the wall of the receiving recess of the first conduit section or the external surface of the second connection end of the second conduit section having formed therein a plurality of second grooves or channels, the plurality of second grooves or channels each being axially spaced apart from one another, and the or each first groove or channel and the plurality of second grooves or channels being accessible from the outside of at least the first conduit section; and
  an elongate flexible anchoring element insertable into the at least one first groove or channel and the plurality of second grooves or channels so as to be seatable in and between both the said at least one first groove or channel and the plurality of second grooves or channels when they have been brought into register or alignment upon insertion of the second connection end of the second conduit section into the receiving recess of the first conduit section,
    whereby upon said insertion and seating of the anchoring element into and between the in-register or aligned at least one first groove or channel and the plurality of second grooves or channels, with the anchoring portions of the anchoring element seated in the said second grooves or channels, the first and second conduit sections are unitable so as to be axially substantially immovable relative to each other.

In embodiments of the pipe joint of the invention any suitable numbers of first and plurality of second grooves or channels in the internal surface of the wall of the receiving recess of the first conduit section and the external surface of the second connection end of the second conduit section, respectively as the case may be, may be provided, for seating therein and therebetween of the various portions of the anchoring element, each of the anchoring portions and the bridging portion of which may be of any suitable or desired or optimum shape or configuration to fulfil their respective functions.

Thus, in accordance with a third aspect of the invention there is provided an elongate flexible anchoring element for use in forming a pipe joint, preferably a pipe joint according to the first aspect of the invention or any embodiment thereof, the anchoring element comprising a plurality of anchoring portions transversely spaced apart from one another across the element and joined by a bridging portion.

In some embodiments the anchoring element may be in the form of a strip, especially a flattened or somewhat flattened strip, comprising the plurality of anchoring portions transversely spaced apart across the strip, with the bridging portion disposed between them. In some practical embodiment forms, two anchoring portions may be provided, one formed or provided on or towards one lateral side of the strip and the other formed or provided on or towards the opposite lateral side of the strip, with the bridging portion forming a central bridging body portion of the strip formed or provided between the pair of anchoring portions.

In some embodiments each of the anchoring portions of the strip may be of an enlarged thickness as compared with the thickness of the bridging portion therebetween. Each of the anchoring portions may of generally the same or different cross-sectional shapes. In some embodiments each anchoring portion may be substantially part-circular or part-elliptical or otherwise arcuate or part-arcuate or rounded in cross-section. Such fattening or forming of a lobe-shape of each anchoring portion may extend or protrude to both sides of a transverse plane passing through or parallel to a general plane of the bridging portion forming the central body of the strip, or may extend to one side only of that plane. Thus, each anchoring portion may be symmetrically or asymmetrically so shaped either side of that transverse plane passing through or parallel to a general plane of the bridging portion forming the central body of the strip.

In some embodiments the bridging portion may be substantially flat, e.g. generally substantially rectangular in cross-section, although other cross-sectional shapes may be possible. In some embodiments the bridging portion may be shaped and dimensioned such that it is readily accommodatable at least partly within the or the respective first groove or channel and between it and a portion of the second conduit section outer wall between respective ones of the plurality of second grooves or channels formed therein.

It is however a particularly preferred feature of the anchoring element in accordance with embodiments of this aspect of the invention that the bridging portion preferably has a sufficient cross-sectional shape, area and structural integrity to enable it to transmit or transfer loading force, especially at least loading force directed transversely across the element in a direction from one anchoring portion to another anchoring portion, between those said anchoring portions. In this way the bridging portion may act to spread or distribute such loading force between the plurality of anchoring portions of the anchoring element, thereby reducing the amount of such loading force experienced by any one anchoring portion alone. This is particularly advantageous in cases where the engineering tolerances of the positioning of the respective first and second grooves or channels in the conduit sections to be joined are relatively large. In this case, the inherent structure and configuration of the bridging portion of the anchoring element, in conjunction with the structure and configuration of the respective anchoring portions thereof, accommodates or takes up (or "absorbs") any such inaccuracies in the respective grooves' or channels' positioning upon axial loading forces being applied to the pipe joint once formed, whilst transmitting or transferring such loading force from at least one of the anchoring elements to at least one other thereof.

In many embodiments the strip of the anchoring element may be formed as a unitary element, e.g. as a unitary extrusion or moulding of the material from which the strip is formed. Thus, in many embodiments the bridging portion may be unitarily formed together with each of the anchoring portions. However, it may be possible in certain alternative example forms that the bridging and anchoring portions are each formed, e.g. by extrusion or moulding, separately and joined together by a suitable welding, gluing or other suitable bonding or joining procedure.

Thus, in some embodiments a single elongate flexible anchoring element may be provided for insertion into and seating in a void created by and between e.g. a single first groove or channel in combination with a pair of (or other plurality of) second grooves or channels, wherein the anchoring element is appropriately constructed, shaped and/or configured with a plurality of portions, especially a plurality of anchoring portions, axially spaced apart relative to the longitudinal axes of the conduit sections and/or transversely spaced apart across the width of the anchoring element itself, to permit such seating and anchoring in and/or between those said first and second grooves or channels.

It is to be understood that, in embodiments of the invention, in a preliminary step of forming the joint between the respective conduit sections, any given combination of a said first and a said plurality of second grooves or channels may be brought into register or alignment in merely general positional terms such that the first groove/channel and the plurality of second grooves/channels generally face each other or are positioned generally and/or approximately radially relative to each other (as defined by the radius of the conduit sections).

In some embodiments the or each combination of first and plurality of second grooves or channels may itself lie or be oriented substantially radially relative to the conduit sections, i.e. the aligned grooves/channels may together be oriented so as to lie substantially in a single plane perpendicular or normal to the longitudinal axial direction of the conduit sections. However in other embodiments the or each combination of first and plurality of second grooves or channels may lie or be oriented so as to lie substantially in a single plane angled at a non-right angle (e.g. at an angle in the range from about 60 or 70 up to about 85 or 87 or 88 or 89°) to the longitudinal axial direction of the conduit sections. In yet other embodiments the or each combination of first and plurality of second grooves or channels may be spatially arranged so as to lie helically, i.e. to form a helical path around the axis of the conduit sections. Such a helical path may extend by at least one revolution around the axis of the conduits sections, optionally a plurality of revolutions therearound.

In the case of plural combinations of first and plurality of second grooves or channels in which each respective combination lies in substantially a single respective plane, the respective planes of different ones of the combinations of first and second grooves or channels may be either substantially parallel to each other or substantially non-parallel, i.e. angled (e.g. at an angle in the range from about 60 or 70 up to about 85 or 87 or 88 or 89°) relative to each other.

In embodiments of the pipe joint the or each first groove or channel and each of the second grooves or channels in the internal surface of the wall of the receiving recess of the first conduit section and the external surface of the second connection end of the second conduit section, respectively as the case may be, may be of the same or substantially the same shape or configuration, or they may be of a different or significantly different shape or configuration from one another. Indeed, in some practical embodiments it may be preferred that the or each first groove/channel is of a first cross-sectional shape configured to substantially match a radially outer section or portion of the anchoring element, whilst each of the second grooves/channels is of a second cross-sectional shape configured to substantially match a radially inner section or portion of the anchoring element, especially at least the radially inner sections or portions of the respective anchoring portions of the anchoring element. Thus, in either case, and in general, the exterior cross-sectional shape or configuration of the elongate flexible anchoring element may be shaped so as to substantially match the interior cross-sectional shape or configuration of the or the respective combination of first and plurality of second grooves or channels when they are brought into register or alignment upon the insertion of the second connection end of the second conduit section into the receiving recess of the first conduit section.

For instance, in one example form the or each first groove/channel, formed e.g. in the internal surface of the wall of the receiving recess of the first conduit section, may be of a first shape/configuration and/or depth, for accommodating a correspondingly shaped/configured first, e.g. outer, radial portion of the anchoring element, and each of the second grooves/channels, formed e.g. in the external surface of the second connection end of the second conduit section, may be of a second shape/configuration and/or depth, for accommodating a correspondingly shaped/configured second, e.g. inner, radial portion of each respective one of the anchoring portions of the anchoring element.

The above first shape/configuration may for instance be a substantially rectangular cross-section, in which the radial bed of the first groove/channel is substantially cylindrical and lies substantially parallel to the longitudinal axis of the first conduit section, optionally with the opposite lateral sides of the first groove/channel oriented substantially perpendicular to the said longitudinal axial direction. The above second shape/configuration may for instance be a substantially non-rectangular cross-section, such as comprising one or a plurality of part-circular-, part-elliptical-, arcuate-, rounded, or regularly- or irregularly-cross-sectioned, e.g. part-toroidal or annular, second groove/channel portions. Of course, the locating of such particularly shaped/configured first and/or second grooves/channels in, respectively, the internal surface of the wall of the receiving recess of the first conduit section and the external surface of the second connection end of the second conduit section may be reversed as or if necessary or desired.

Thus, in the above embodiments of differently shaped/configured first and second grooves/channels, the exterior shape or configuration of the elongate flexible anchoring element may preferably be shaped or configured into respective first and second radial anchoring portions which substantially match or fit within the respective radial portions of the respective first and second grooves/channels into which they are to be seated when the joint is formed.

In practical embodiments of the pipe joint of the invention, such as any of those defined above or below, the first and plurality of second grooves or channels may each be formed by any suitable method or technique for forming grooves or channels in pipe walls or in surfaces of pipe walls adjacent or near connection ends thereof. Such methods or techniques may include any one or more of the following: production moulding (i.e. upon manufacture of the relevant conduit section itself), cutting, machining, routing or grinding. Post-production cutting or machining may be especially useful in many practical example embodiments. Suitable apparatuses or devices for performing such cutting or machining, or even other, groove- or channel-forming techniques, are well-known and widely available in the art and the patent literature.

In embodiments of the invention in its various aspects the elongate flexible anchoring element may be made of any suitable flexible material, such as a metal or metal alloy, e.g. spring steel, or a plastics material, e.g. made by any suitable moulding or extrusion process. Examples of suitable plastics materials include nylon and polyethylene. A plastics material may be especially preferred owing to its low cost, ease of manufacture, physical strength and desirable flexible properties. It may be especially preferred that the material of the anchoring element has a degree of flexibility which is at least as great as, and possibly greater than, the degree of flexibility of the material from which the conduit sections themselves are formed. The advantage of this is that the preferably stiffer or harder material of the conduit wall material, as compared with the anchoring element, avoids the occurrence of flexure or deformation of the conduit wall material itself upon application of axial loading force before the material of the anchoring element itself has begun to take up such loading force and flex in response thereto whilst transmitting or transferring at least some of that force between the respective anchoring portions of the anchoring element seated in the respective first and second grooves/channels.

In preferred embodiments the material of the anchoring element may be sufficiently flexible, or possibly even sufficiently resiliently flexible, to enable the anchoring element to be insertable into the or the respective first groove or channel and plurality of second grooves or channels from the outside of at least the first conduit section. If desired or necessary the material of the anchoring element may have a degree of inherent resilience or resilient softness such that it may act as a seal against a surface of the respective first and/or second grooves or channels against which it abuts when in its seated position therein.

Preferably the anchoring element may be elongate, e.g. in the form of a linear, somewhat flattened strip, preferably with a length at least sufficient for it to be insertable into at least a major proportion of the linear length of the respective first and second grooves or channels. That major proportion of the linear length of the first and second grooves or channels may in some particularly preferred cases be substantially the whole of that linear length of the first and second grooves or channels, especially in cases where that linear length thereof is a single circumferential length. Such an arrangement may be particularly useful for enhancing the strength of the resulting joint connection.

In some embodiments the anchoring element may have a radial dimension at any given axial location therealong which is at least equal to the combined radial dimensions of the aligned respective first and second grooves or channels, or in the case of the bridging portion of the anchoring element at least the combined radial dimensions of the aligned first groove/channel and a portion of the second (or first, if provided that other way round) conduit section wall between respective ones of the second grooves/channels, into and/or between which the anchoring element is to be seated, at that axial location. In particular, the radial dimension of the anchoring element (corresponding to the thickness of the strip forming the anchoring element) may, at any of two or more selected axial locations therealong, be greater than the corresponding radial dimension of the respective first groove or channel, whereby those selected axial locations correspond to and form the preferably enlarged or lobe-like said anchoring portions of the anchoring element which preferably fit snugly within the respective second grooves or channels aligned therewith when the anchoring strip is inserted into the respective first and second grooves or channels from the outside of the first conduit section.

If desired or necessary the radial dimension of the anchoring element, at any given axial location therealong, may even be slightly greater than (e.g. by about up to 0.1 or 0.5 or 1 or 2 or even up to about 5 or even up to as much as about 10% of) the combined radial dimensions of the aligned first and second grooves or channels or the space between the first groove or channel and the portion of the second (or first, if provided that other way round) conduit outer wall between the respective second grooves or channels, as the case may be. In this case any such excess radial width of the respective portion of the anchoring element may be taken up or accommodated by any inherent resilient softness of the anchoring element material itself, thereby contributing to the sealing effect of the anchoring element against the relevant internal surfaces of the respective first and/or second grooves or channels (or wall between the second grooves/channels, as the case may be) against which it abuts when in its seated position therein.

In certain embodiments of the pipe joint of the invention there may, if desired or necessary, additionally be provided at least one secondary seal element or member between a portion of the receiving recess of the first conduit section and a portion of the second conduit section.

Such a secondary seal element or member, which may serve to additionally provide sealing between the respective first and second conduit sections once the joint therebetween has been formed, may be of any conventional type of seal used in the current art, e.g. one or more lip seals, brush seals, leaf seals, finger seals, labyrinth seals, piston rings, split ring seals, carbon seals, or any other suitable type of compliant or resilient contacting seal. Such a secondary seal element or member may optionally be provided or mounted in its own dedicated secondary sealing groove, channel or recess formed in one or other or both of a portion of the inner surface of the receiving recess of the first conduit section and a portion of the outer surface of the second conduit section. Such a secondary sealing groove, channel or recess may be axially spaced from or adjacent the respective first and second grooves or channels which form the pipe joint itself.

In some embodiments, alternatively or additionally to the above at least one secondary seal element or member, the receiving recess of the first conduit section may be provided internally with an end-abutment seating and sealing element, device or arrangement, against which a terminal end of the connection end of the second conduit section may abut and seal once it has been inserted into the recess for forming the joint. Such an arrangement may further enhance the sealing efficacy of the joint between the conduit sections once formed.

In some embodiments the insertion of the anchoring element into the respective first and second grooves or channels may be via an insertion channel or passage which communicates between at least the first groove or channel (and preferably also the second grooves or channels and the outside of, especially an exterior surface of, at least the first conduit section. Such an insertion channel or passage may preferably be oriented non-radially, e.g. tangentially, chordally, or otherwise transversely, relative to the cross-section of the first conduit section. The or the respective insertion channel or passage may preferably be internally shaped and dimensioned to sufficiently accommodate the or the respective anchoring element which is to be inserted therethrough. In some embodiments the or the respective insertion channel or passage may merge smoothly into or with the respective first and second grooves or channels so that the anchoring element can pass smoothly from the former into the latter during its insertion operation.

In some embodiments, for enhancing the ease of insertion of the anchoring element in the respective first and second grooves or channels, the anchoring element may be provided with a terminal end portion comprising a handle, hook or other engagement or manipulation device, so that it may for example be grasped and manipulated manually, or alternatively by use of a tool. Furthermore, if desired or necessary, a lubricant material, e.g. Teflon®, may be applied to, e.g. as a coating on, the anchoring element to further facilitate the sliding insertion or extraction thereof into and/or from the respective first and second grooves or channels, preferably via the or the respective preferred insertion channel or passage.

In some embodiments the above-mentioned terminal end portion of the anchoring element may be seatable and/or engageable and/or sealable in a or a respective parking recess, channel or engagement device formed or provided in or on the exterior, especially an exterior surface, of the first conduit section, in order not only to provide a convenient parking site for that terminal end of the inserted anchoring element, but also to prevent or help prevent its unwanted, accidental or unauthorised withdrawal therefrom.

In a fourth aspect of the invention there is provided a method of joining together at least two conduit sections of a pipe, pipeline or other conduit, wherein the conduit sections comprise a first conduit section having at least one first connection end comprising a wall defining a receiving recess for receiving a second connection end of a second conduit section, there being formed in one of an internal surface of the wall of the receiving recess of the first conduit section or an external surface of the second connection end of the second conduit section at least one first groove or channel, and there being formed in the other of the internal surface of the wall of the receiving recess of the first conduit section or the external surface of the second connection end of the second conduit section a plurality of second grooves or channels, the plurality of second grooves or channels being axially spaced apart from one another, and the or each first groove or channel and the plurality of second grooves or channels being accessible from the outside of at least the first conduit section;

wherein the method comprises:
providing at least one elongate flexible anchoring element comprising a plurality of anchoring portions axially spaced apart from one another and joined by a bridging portion therebetween, the anchoring and bridging portions being configured such that each anchoring portion is placeable in a respective one of the said second grooves or channels;
inserting the second connection end of the second conduit section into the receiving recess of the first conduit section such as to bring into register or alignment the at least one first groove or channel and the plurality of second grooves or channels; and inserting the said elongate flexible anchoring element into the at least one first groove or channel and the plurality of second grooves or channels so as to be seated in and between both the said at least one first groove or channel and the plurality of second grooves or channels;

whereby following said insertion and seating of the anchoring element into and between the in-register or aligned at least one first groove or channel and the plurality of second grooves or channels, with the anchoring portions of the anchoring element seated in the said second grooves or channels, the first and second conduit sections are united so as to be axially substantially immovable relative to each other.

In some practical embodiments of the above method, the method may comprise the additional steps of actually forming in the internal surface of the wall of the receiving recess of the first conduit section and the external surface of the second connection end of the second conduit section the said at least one first groove or channel accessible from the outside of the first conduit section and/or the said plurality of second grooves or channels, respectively as the case may be. Some embodiments of the method may further additionally comprise the step of forming, e.g. by drilling, the above-mentioned optional yet preferred insertion channel or passage which communicates between the first and second grooves or channels and the outside of, especially an exterior surface of, the first conduit section, via which insertion channel or passage the anchoring element is insertable into the first and second grooves or channels.

In embodiments of the above jointing method any of its individual defined features may be the same as or correspond to any of those defined or described above or below in the context of any embodiments of any other aspect of the invention.

In a fifth aspect of the invention there is provided a pipe or pipeline formed from a plurality of conduit sections, wherein adjacent conduit sections are joined together using a joint according to the first aspect of the invention or any embodiment of, or formed using the kit of parts according to the second aspect or any embodiment thereof, or by a jointing method according to the fourth aspect of the invention or any embodiment thereof.

In embodiments of the above pipe or pipeline any of its individual defined features may be the same as or correspond to any of those defined or described above or below in the context of any embodiments of any other aspect of the invention.

In practical use or deployment of embodiments of pipe joint within the scope of the invention, subsequent to the joint having been formed, it may be disassembled and the first and second conduit sections disconnected by simple reversing the steps by which the joint was formed in the first place. Thus, such a disassembly or disconnection method may include the sequential steps of withdrawing or removing the anchoring element from the first and second grooves or channels, for example via the exterior-communicating insertion channel or passage through which it was passed to form the joint, thereby allowing the first and second conduit sections to be axially moveable relative to each other once more, following which the first and second conduit sections can be drawn apart and detached from one another. This simple, non-invasive and non-destructive process may thus avoid damage to the first and second conduit sections and also preserve the structural integrity and shape and configuration of the walls defining the first and second connection ends of, respectively, the first and second conduit sections.

Embodiments of the pipe joint of the invention may be applied to a wide variety of pipes or conduits, for conveying a wide variety of materials. Its applicability to the connecting together or jointing of adjacent or sequential conduit sections in the forming of pipelines for various fluid, e.g. gaseous or liquid, products, such as oil, gas or other fuels, may be an especially useful application. Such pipes or conduits may often be substantially circular or cylindrical in cross-section, although other shaped cross-sections may be possible.

Embodiments of the pipe joint of the invention are relatively cheap to make and install, requiring few component parts and little or no specialist machinery, and the jointing operation itself may be carried out wholly from outside the conduit sections to be joined. They are also particularly safe to install and use, as they do not require welding as in many prior art pipe jointing systems.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one particular embodiment are applicable to all embodiments, unless expressly stated otherwise or such features are incompatible.

BRIEF DESCRIPTION OF THE DRAWINGS

One or more embodiments of the invention in its various aspects will now be described, by way of example only, with reference to the accompanying drawings, in which.

DETAILED DESCRIPTION OF EMBODIMENTS

Figure 1:
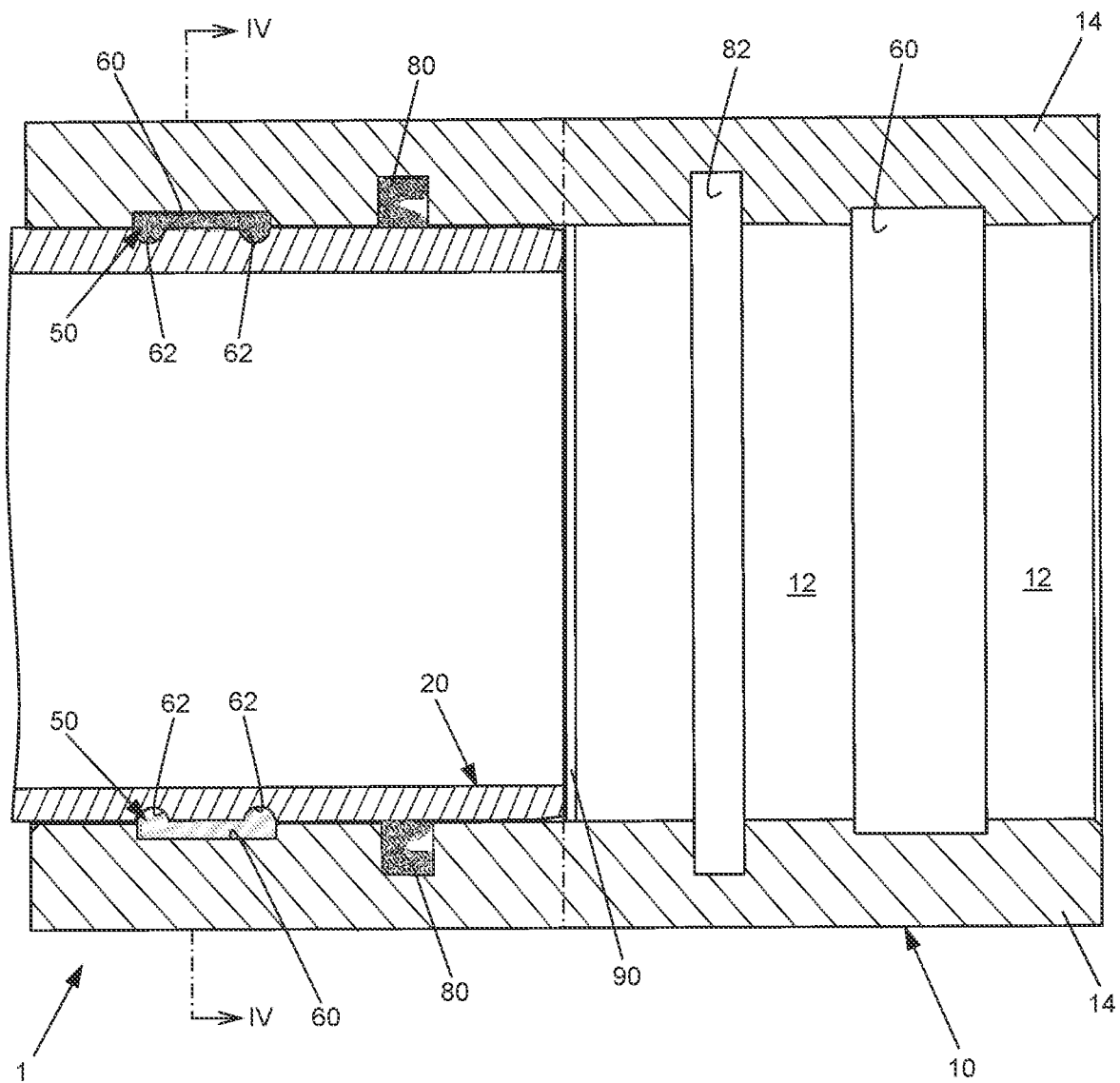
FIG. 1 is a longitudinal cross-sectional view of a pipe joint according to one example embodiment of the invention, shown forming a joint between a first (outer) conduit or pipe section and a second (inner) conduit or pipe section.

Referring firstly to FIG. 1, the pipe (or conduit) joint shown generally as 1 is formed between a first, or female, conduit or pipe section 10 and a second, or male, conduit or pipe section 20 of smaller diameter than the first section 10. The walls 14 of a connection end of the first conduit section 10 form and define a receiving recess 12 for receiving therein a connection end of the second conduit section 20. The joint 1 is formed once the connection end of the second conduit section has been inserted into the receiving recess 12 of the connection end of the first conduit section 10. The pipe (or conduit) sections 10, 20 are formed e.g. of a plastics material, or alternatively of a metal or metal alloy, depending for example on the practical application of the pipe (or conduit) and, in particular, the material to be conveyed by it.

In a typical example the pipe or conduit sections form part of a pipe or pipeline for conveying liquid or gaseous fluids, such as oil or gas, or even water, sewage or other flowable material. The pipe or pipeline diameter may be of any suitable or desired size, e.g. depending on the industrial application and the material to be conveyed by it. By way of example, a general pipe or pipeline diameter of the order of approximately 1 to 1.5 metres may be typical for e.g. long-distance oil or gas pipelines. The sizing of the components forming the joint 1 may be scaled up or down as appropriate to the size and scale of the pipe or pipeline whose pipe or conduit sections 10, 20 are to be joined.

Figure 2:
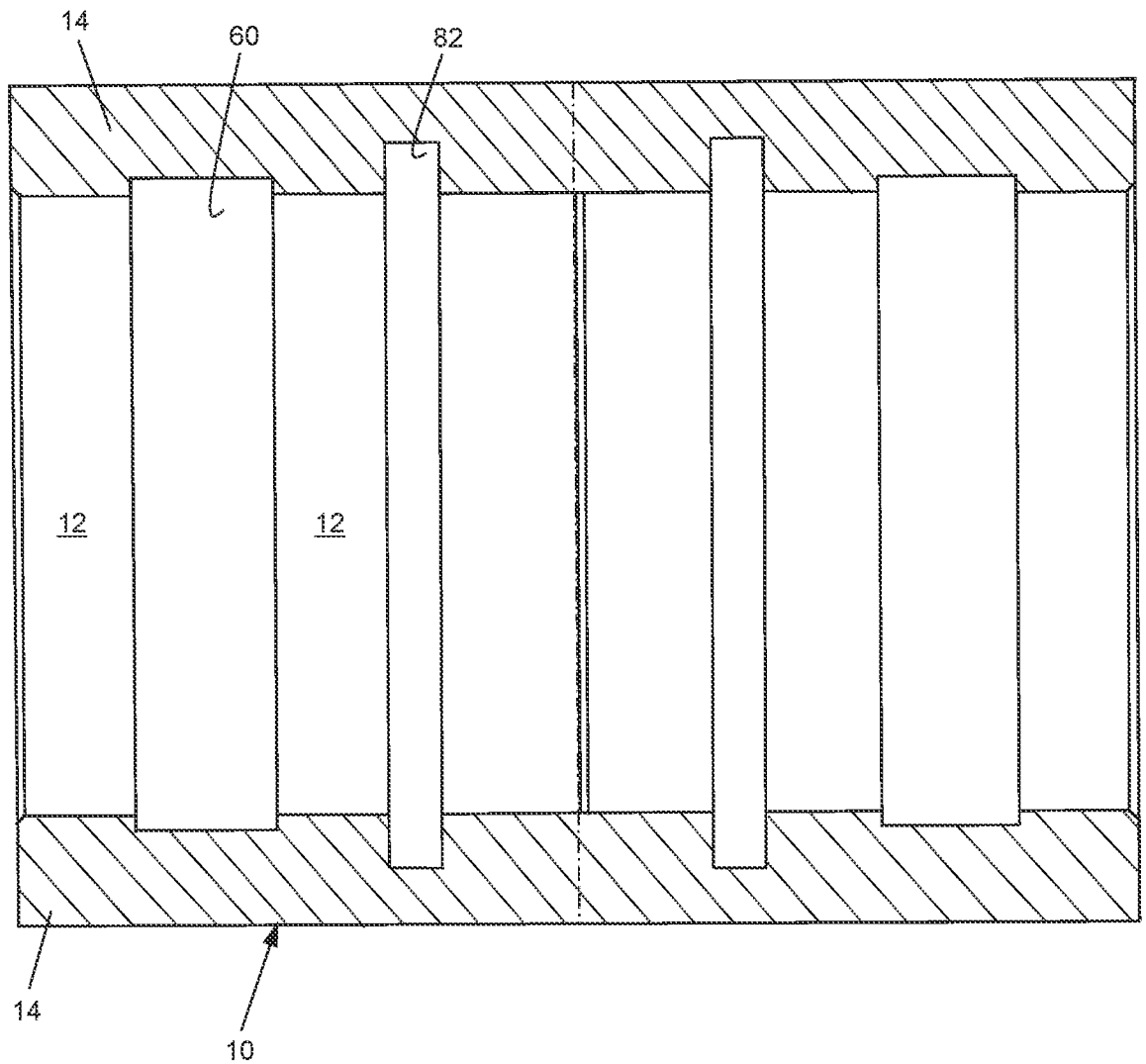
FIG. 2 is a longitudinal cross-sectional view of the first, i.e. outer, conduit or pipe section alone, showing more clearly the arrangement and configuration of the various internal grooves or channels therein.

In FIGS. 1 and 2 the arrangement is illustrated with the first (female) conduit section 10 having two opposite connection ends, with each end being formed with the same arrangement of internal grooves or channels for forming at each such end a respective joint to an adjacent or sequential second conduit section along the pipeline. The first (female) conduit section 10 may of course be of any suitable longitudinal length, although it is shown here in compacted or truncated form for ease of explanation of the construction and configuration of the joint of the embodiment. However, for clarity, the arrangement of internal grooves or channels in the left-hand connection end of the first (female) conduit section 10 into which is shown fitting the connection end of the second (male) conduit section 20 is described by use of reference numerals applied to the corresponding features at the opposite, right-hand connection end of the first (female) conduit section 10 where the same form of joint 1 may be formed with a like second (male) conduit section 20.

The joint 1 is formed by the interaction or cooperation between respective first 60 and a pair of second 62 grooves or channels formed, respectively, in the first and the second conduit sections 10, 20, and an elongate flexible anchoring element 50 inserted therein from the outside of the conduit sections 10, 20. The flexible anchoring element 50 takes the form of an extruded somewhat flattened strip of plastics material, e.g. a polymeric material such as a nylon, polyethylene, polypropylene or other tough yet flexible, or resiliently flexible, material. Optionally the anchoring strip 50 may be coated with a low-friction material or lubricant, e.g. Teflon O. An inherent degree of resilience or resilient softness of the plastics material of the anchoring strip 50 may serve to introduce a sealing function to the strip in addition to its primary anchoring and joint-forming functionality.

The first groove or channel 60 is formed in the interior surface of the wall of the receiving recess 12 of the first pipe section 10, such as by a post-production cutting or machining operation using any suitable conventional machine or equipment. The first groove or channel 60 is shown here as being of rectangular cross-section, so as to form a rectangular recessed internal groove extending circumferentially all the way round the internal wall of the first pipe section 10.

To provide access to the first groove or channel 60 from the outside of the first pipe section 10 an access insertion passage or channel 70 is formed generally transversely, e.g. chordally or even tangentially, through the material of the wall 14 of the first pipe section 10 so as to link and provide communication between the first groove or channel 60 and the outside. Where the insertion passage or channel 70 meets the first groove or channel 60 the junction is preferably of the nature of a smooth merging between the two, so as to facilitate the passage of the forward terminal end of the anchoring strip 50 into the latter from the former with a continuous motion or pushing force.

Figure 4:
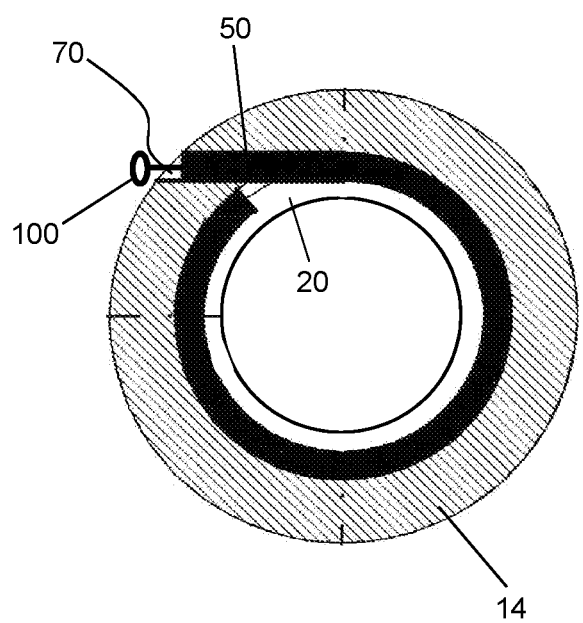
FIG. 4 is an end-on, part-sectional view of the joint of FIG. 1 along arrows IV-IV therein.

The insertion passage or channel 70 has a cross-sectional shape which substantially matches that of the anchoring strip 50, so it may be readily inserted therein and passed therethrough by simple pushing. The configuration of the insertion passage or channel 70 is shown more clearly in FIG. 4.

The pair of second grooves or channels 62 is formed in the exterior surface of the connection end of the second pipe section 20, again by a conventional cutting or machining process.

The pair of second grooves or channels 62 is configured as the combination of a pair of discrete, axially spaced apart, part-circular-sectioned groove or channel portions extending circumferentially around the second pipe section connection end. The pair of discrete, axially spaced apart, part-circular-sectioned groove or channel portions 62 may or may not themselves be joined by a flat central bridging groove or channel portion, depending for example on the radial thickness of the central bridging portion 56 (see FIG. 3) of the anchoring strip 50 to be accommodated in the void created by and between the combined first and second grooves or channels 60, 62 once they have been brought into register or alignment upon the insertion of the connection end of the second pipe section 20 into the receiving recess 12 of the first pipe section 10.

Figure 3:
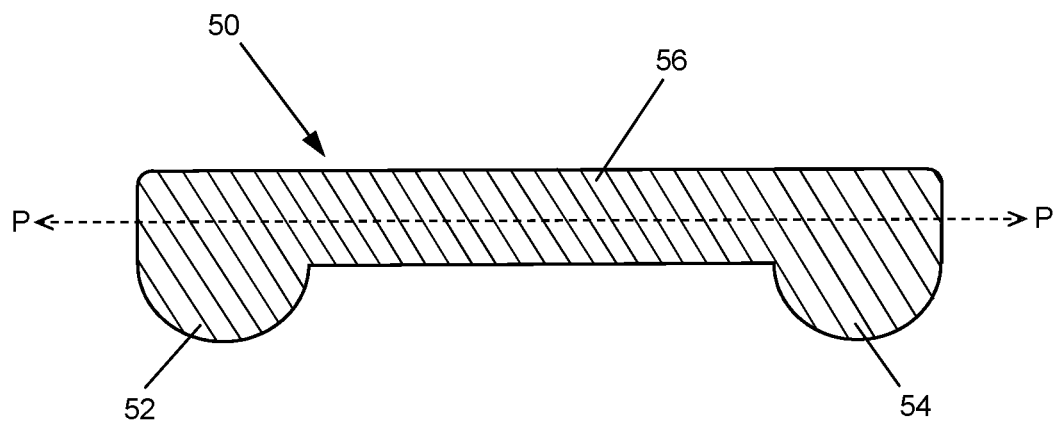
FIG. 3 is an enlarged sectional view of the elongate anchoring element itself which is used to anchor the joint of FIG. 1.

As shown in FIG. 3, the anchoring strip 50 is formed with an overall shape which substantially matches the shape of the combined first and second grooves or channels 60, 62 once they have been brought into register or alignment upon the insertion of the connection end of the second pipe section 20 into the receiving recess 12 of the first pipe section 10. For this purpose the anchoring strip 50 comprises a generally rectangular central bridging portion 56, configured at its radially outer side for seating within the correspondingly shaped recessed first groove or channel 60, and a pair of axially spaced apart radially inner lobe-like anchoring portions 52, 54. The pair of lobe-like anchoring portions 52, 54 extend or protrude to either one or both sides of a plane P passing through (or parallel to) the general plane of the bridging portion 56 of the anchoring strip 50, and are configured for seating within the respective correspondingly shaped part-circular-sectioned groove or channel portions 62 forming the pair of second grooves or channels.

The material of the anchoring strip 50 is sufficiently rigid or stiff to enable it to transmit loading forces through itself, and in particular across its transverse width between the two lobe-like anchoring portions 52, 54. This serves to enable such axial loading forces—which typically occur during use of the pipe joint, especially when pumping fluids at high pressures and/or in a pulsating manner—to be spread more evenly between the lobe-like anchoring portions 52, 54, and indeed to be transmitted or transferred between the lobe-like anchoring portions 52, 54 as such loading forces are applied or experienced. This is important in the case of typically relatively large manufacturing tolerances encountered in the axial positioning of the respective second grooves or channels 62, and possibly also the first groove or channel 60. In practice this is often manifested by inaccuracies in the transverse (left-to-right across the width of the strip 50 as shown in FIG. 3) spacing of the centres of the lobes 52, 54, and often variations in that spacing around the circumference of a given pipe section and/or variations in such spacing as between different connection ends of different pipe sections, making it difficult to deploy like components of a single given design in multiple scenarios in forming joints between different pipe sections. In such circumstances it is difficult to spread such axial loading forces evenly between the two lobe-like anchoring portions 52, 54 without one or other thereof still bearing substantially maximum load over at least part of any loading period or cycle. However, by employment of the interconnected lobe-like anchoring portions 52, 54 joined by the load/force-transmitting or load/force-transferring bridging portion 56, this problem can be ameliorated or may even be substantially circumvented and such loading forces spread more evenly between the individual functional components of the joint-forming arrangement. This therefore may lead to reduced wear on the first and second grooves or channels 60, 62, as well as on the anchoring strip 50 itself, leading to improved life, efficiency and economy of deployment and maintenance of the joint.

In order to further enhance the sealing between the first and second pipe sections 10, 20 as or once the joint is formed, a secondary seal 80 may be provided, which in this illustrated example is in the form of an elastomeric or resilient lip sealing member or piston-ring-type seal 80 located in its own dedicated secondary sealing groove or channel 82 formed, e.g. again by cutting, in the interior wall of the receiving recess 12 of the first pipe section 10. An end-abutment seating and sealing element 90 may also be provided, against which the terminal end of the second pipe section 20 abuts and seals.

In order to form the pipe joint 1, the following sequence of steps are performed:

(1) insert the (male) connection end of the second pipe section 20 into the (female) receiving recess 12 of the first pipe section 10;

(2) slide the (male) connection end of the second pipe section 20 along and within the (female) receiving recess 12 of the first pipe section 10 far enough to bring into register or alignment the radially outer first groove or channel 60 and the pair of arcuate part-circular-sectioned second groove or channel portions 62 of the radially inner second grooves or channels 62, thereby forming or defining a void by and between the combined aligned radially outer 60 and radially inner 62 grooves or channels;

(3) insert the elongate, flexible anchoring strip 50 into the transverse insertion passage or channel 70 and from there onward and into the first groove or channel 60 and second grooves or channels 60, 62 so that it becomes seated and accommodated within the void formed by and between the combined aligned outer and inner first and second grooves or channels 60, 62;

(4) in which final configuration—following the insertion and seating of the anchoring strip 50 into the combined aligned outer and inner first and second grooves or channels 60, 62—the first and second pipe sections 10, 20 are united so as to be axially substantially immovable relative to each other and thus securely joined together.

As or when it may be necessary, e.g. for maintenance or repair of either pipe section 10, 20, or even replacement of any component(s) of the joint 1, or possibly even for dismantling of the joint 1 for re-assembly elsewhere or entire moving of the pipeline, disassembly or disconnection of the joint 1 may be carried out simply and without damage to either pipe section 10, 20 or components of the joint by reversing the above sequence of steps, that is to say:

(5) starting from the condition in which the first and second pipe sections 10, 20 are united so as to be axially substantially immovable relative to each other and thus securely joined together following insertion and seating of the anchoring strip 50 into the void formed by and between the combined aligned outer and inner first and second grooves or channels 60, 62: slidably remove or extract—e.g. by simple pulling of a handle or hook 100 provided at its free outer end, either manually or by use of a tool—the flexible anchoring strip 50 from the first and second grooves or channels 60, 62 via the transverse insertion passage or channel 70, and from there completely remove it to the outside of the pipe sections 10, 20;

(6) with the pipe sections 10, 20 now no longer fixedly united together in the axial direction and therefore free to slide axially relative to one another: slide the (male) connection end of the second pipe section 20 in the reverse axial direction along and within the (female) receiving recess 12 of the first pipe section 10 far enough to remove the (male) connection end of the second pipe section 20 from the (female) receiving recess 12 of the first pipe section 10, in which final condition the two pipe sections 10, 20 are now detached from one another and can be removed separately for whatever onward treatment, attention or use is required.

Throughout the description and claims of this specification, the words "comprise" and "contain" and linguistic variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A pipe joint for joining a first conduit section to a second conduit section, the first conduit section having at least one first connection end comprising a wall defining a receiving recess for receiving a second connection end of the second conduit section, wherein the joint comprises:

at least one first groove or channel formed in one of an internal surface of the wall of the receiving recess of the first conduit section or an external surface of the second connection end of the second conduit section;

a plurality of second grooves or channels formed in the other of the internal surface of the wall of the receiving recess of the first conduit section or the external surface of the second connection end of the second conduit section, the plurality of second grooves or channels each being axially spaced apart from one another, the or each first groove or channel and the plurality of second grooves or channels being accessible from the outside of at least the first conduit section; and an elongate flexible anchoring element in the form of a strip comprising a plurality of elongate anchoring portions transversely spaced apart from one another across the strip and joined by an elongate bridging portion disposed between the elongate anchoring portions and extending along the lengths of the anchoring portions so as to interconnect the elongate anchoring portions along the lengths, and the anchoring and bridging portions being configured such that each anchoring portion is placeable in a respective one of the said second grooves or channels, wherein the elongate flexible anchoring element is inserted into the at least one first groove or channel and the plurality of second grooves or channels so as to be seated in and between both the said at least one first groove or channel and the plurality of second grooves or channels when the said at least one first groove or channel and the plurality of second grooves or channels have been brought into register or alignment upon insertion of the second connection end of the second conduit section into the receiving recess of the first conduit section, whereby upon said insertion and seating of the anchoring element into and between the in-register or aligned at least one first groove or channel and the plurality of second grooves or channels, with the plurality of anchoring portions of the anchoring element seated in the said plurality of second grooves or channels, the first and second conduit sections are united so as to be axially substantially immovable relative to each other.

2. A pipe joint according to claim 1, wherein the anchoring element comprises two anchoring portions, one formed or provided on or towards one lateral side of the strip and the other formed or provided on or towards the opposite lateral side of the strip, with the bridging portion forming a central bridging body portion of the strip formed or provided between the pair of anchoring portions and extending along the lengths of the anchoring portions.

3. A pipe joint according to claim 1, wherein each of the plurality of anchoring portions of the strip is of an enlarged thickness as compared with the thickness of the bridging portion therebetween, and wherein the bridging portion is substantially flat, with a generally substantially rectangular cross-section, and wherein each anchoring portion is substantially part-circular or part-elliptical or otherwise arcuate or part-arcuate or rounded in cross-section.

4. A pipe joint according to claim 3, wherein either:
(i) a fattening or forming of a lobe-shape of the cross-section of each anchoring portion extends or protrudes to both sides of a plane passing through or parallel to a general plane of the bridging portion forming the central body of the strip, or
(ii) a fattening or forming of a lobe-shape of the cross-section of each anchoring portion extends or protrudes to one side only of a plane passing through or parallel to a general plane of the bridging portion forming the central body of the strip.

5. A pipe joint according to claim 1, wherein the bridging portion has a shape, cross-sectional area and structural integrity such as to enable the bridging portion to transmit or transfer loading force, directed transversely across the anchoring element in a direction from one anchoring portion to another anchoring portion and between those said anchoring portions, whereby the bridging portion can act to spread or distribute such loading force between the plurality of anchoring portions of the anchoring element, thereby reducing the amount of such loading force experienced by any one anchoring portion alone.

6. A pipe joint according to claim 1, wherein:
a single elongate flexible anchoring element is provided for insertion into and seating in a void created by and between a single first groove or channel in combination with a pair of second grooves or channels, wherein the anchoring element is constructed, shaped and/or configured with a pair of the said anchoring portions transversely spaced apart across a width of the anchoring element, to permit the said seating and anchoring in and/or between those said first and second grooves or channels.

7. A pipe joint according to claim 1, wherein the combination of a said first and a said plurality of second grooves or channels lies or is oriented substantially radially relative to the conduit sections, such that the aligned grooves/channels are together oriented so as to lie substantially in a single plane perpendicular or normal to the longitudinal axial direction of the conduit sections.

8. A pipe joint according to claim 1, wherein the or each first groove or channel and each of the second grooves or channels in the internal surface of the wall of the receiving recess of the first conduit section and the external surface of the second connection end of the second conduit section, respectively as the case may be, are of a different shape or configuration from one another;
and wherein the or each first groove or channel is of a first cross-sectional shape configured to substantially match a radially outer section or portion of the anchoring element, and each of the second grooves or channels is of a second cross-sectional shape configured to substantially match a radially inner section or portion of the anchoring element;
and wherein the exterior cross-sectional shape or configuration of the elongate flexible anchoring element is shaped so as to substantially match the interior cross-sectional shape or configuration of the or the respective combination of the first groove or channel and the plurality of second grooves or channels when the first groove or channel and the plurality of second grooves or channels are brought into register or alignment upon the insertion of the second connection end of the second conduit section into the receiving recess of the first conduit section.

9. A pipe joint according to claim 8, wherein the or each first groove or channel is of a first shape or configuration and/or depth for accommodating a correspondingly shaped or configured first radial portion of the anchoring element, and each of the second grooves or channels is of a second shape or configuration and/or depth for accommodating a correspondingly shaped or configured second radial portion of each respective one of the anchoring portions of the anchoring element, wherein the said first and second shapes or configurations are different from each other;
wherein the said first shape or configuration is a substantially rectangular cross-section, in which a radial bed of the first groove or channel is substantially cylindrical and lies substantially parallel to a longitudinal axis of the first conduit section, with the opposite lateral sides of the first groove or channel oriented substantially perpendicular to the said longitudinal axial direction;
wherein the said second shape or configuration is a substantially non-rectangular cross-section comprising one or a plurality of part-circular-, part-elliptical-, arcuate-, rounded, or regularly- or irregularly-cross-sectioned second groove or channel portions; and
wherein the exterior shape or configuration of the elongate flexible anchoring element is shaped or configured into respective first and second radial anchoring portions which substantially match or fit within the respective radial portions of the respective first and second grooves or channels into which they are to be seated when the joint is formed.

10. A pipe joint according to claim 1, wherein the elongate flexible anchoring element is made of a flexible material selected from a metal or metal alloy or a plastics material,
and wherein the material of the anchoring element has a degree of flexibility which is at least as great as the degree of flexibility of the material from which the conduit sections themselves are formed.

11. A pipe joint according to claim 1, wherein the anchoring element is formed of a material which has a degree of flexibility such as to enable the anchoring element to be insertable into the or the respective first groove or channel and plurality of second grooves or channels from the outside of at least the first conduit section;

and wherein the material of the anchoring element has a degree of inherent resilience or resilient softness such that the anchoring element acts as a seal against a surface of the respective first and/or second grooves or channels against which the anchoring element abuts when in a seated position therein.

12. A pipe joint according to claim 1, wherein the anchoring element is elongate and in the form of a linear, flattened strip with a length, relative to a linear length of the respective first and second grooves or channels, which is at least sufficient for the strip to be insertable into at least a major proportion of, or substantially the whole of, the linear length of the respective first and second grooves or channels.

13. A pipe joint according to claim 1, wherein the anchoring element has a radial dimension at any given axial location therealong which is at least equal to the combined radial dimensions of the aligned respective first and second grooves or channels, or in the case of the bridging portion of the anchoring element at least the combined radial dimensions of the aligned first groove or channel and a portion of a conduit section wall between respective ones of the second grooves or channels, into and/or between which the anchoring element is to be seated, at that axial location;

wherein the radial dimension of the anchoring element which corresponds to the thickness of the strip forming the anchoring element is, at any of two or more selected axial locations therealong, greater than the corresponding radial dimension of the respective first groove or channel, whereby those selected axial locations correspond to and form enlarged said anchoring portions of the anchoring element which fit snugly within the respective second grooves or channels aligned therewith when the anchoring strip is inserted into the respective first and second grooves or channels from the outside of the first conduit section; and wherein the radial dimension of the anchoring element, at any given axial location therealong, is greater than the combined radial dimensions of the aligned first and second grooves or channels or the space between the first groove or channel and the portion of the conduit section wall between the respective second grooves or channels.

14. A pipe joint according to claim 1, further comprising at least one secondary seal element or member between a portion of the receiving recess of the first conduit section and a portion of the second conduit section, wherein the said secondary seal element or member is provided or mounted in its own dedicated secondary sealing groove, channel or recess formed in a portion of the inner surface of the receiving recess of the first conduit section, wherein the said secondary sealing groove, channel or recess is axially spaced from or adjacent the respective first and second grooves or channels which form the pipe joint itself.

15. A pipe joint according to claim 1, wherein the receiving recess of the first conduit section is provided internally with an end-abutment seating and sealing element, device or arrangement, against which a terminal end of the connection end of the second conduit section can abut and seal once the terminal end of the connection end of the second conduit section has been inserted into the recess for forming the joint.

16. A pipe joint according to claim 1, wherein the insertion of the anchoring element into the respective first and second grooves or channels is via an insertion channel or passage which communicates between (i) the first and second grooves or channels and (ii) the outside of at least the first conduit section, and wherein the said insertion channel or passage is oriented non-radially relative to the cross-section of the first conduit section.

17. A pipe joint according to claim 16, wherein the said insertion channel or passage merges smoothly into or with the respective first and second grooves or channels so that the anchoring element can pass smoothly from the former into the latter during the insertion.

18. A pipe joint according to claim 1, wherein, for enhancing the ease of insertion of the anchoring element in the respective first and second grooves or channels, the anchoring element is provided with a terminal end portion comprising a handle, hook or other engagement or manipulation device, so that it can be grasped and manipulated manually or alternatively by use of a tool.

19. A pipe joint according to claim 18, wherein the terminal end portion of the anchoring element is seatable and/or engageable and/or sealable in a or a respective parking recess, channel or engagement device formed or provided in or on the exterior of the first conduit section.

20. A kit of parts for forming a joint according to claim 1 between a first conduit section and a second conduit section, wherein the said kit comprises:

the said first conduit section and the said second conduit section,
wherein the first conduit section has at least one first connection end comprising a wall defining a receiving recess for receiving a second connection end of the second conduit section,
and wherein one of an internal surface of the wall of the receiving recess of the first conduit section or an external surface of the second connection end of the second conduit section has formed therein at least one first groove or channel, and the other of the internal surface of the wall of the receiving recess of the first conduit section or the external surface of the second connection end of the second conduit section having formed therein a plurality of second grooves or channels, the plurality of second grooves or channels each being axially spaced apart from one another, and the or each first groove or channel and the plurality of second grooves or channels being accessible from the outside of at least the first conduit section; and
an elongate flexible anchoring element in the form of strip comprising a plurality of elongate anchoring portions transversely spaced apart from one another across the strip and joined by an elongate bridging portion disposed between the elongate anchoring portions and extending along the lengths of the anchoring portions so as to interconnect the elongate anchoring portions along the lengths, and the anchoring element being insertable into the at least one first groove or channel and the plurality of second grooves or channels so as to be seatable in and between both the said at least one first groove or channel and the plurality of second grooves or channels when the said at least one first groove or channel and the plurality of second grooves or channels have been brought into register or alignment upon insertion of the second connection end of the second conduit section into the receiving recess of the first conduit section, whereby upon said insertion and seating of the anchoring element into and between the in-register or aligned at least one first groove or channel and the plurality of second grooves or channels, with the plurality of anchoring portions of the anchoring element seated in the said plurality of second grooves or channels, the first and second conduit sections are unitable so as to be axially substantially immovable relative to each other.

21. A method of joining together at least two conduit sections of a pipe, pipeline or other conduit, wherein the conduit sections comprise a first conduit section having at least one first connection end comprising a wall defining a receiving recess for receiving a second connection end of a second conduit section, there being formed in one of an internal surface of the wall of the receiving recess of the first conduit section or an external surface of the second connection end of the second conduit section at least one first groove or channel, and there being formed in the other of the internal surface of the wall of the receiving recess of the first conduit section or the external surface of the second connection end of the second conduit section a plurality of second grooves or channels, the plurality of second grooves or channels being axially spaced apart from one another, and the or each first groove or channel and the plurality of second grooves or channels being accessible from the outside of at least the first conduit section;

wherein the method comprises:

providing at least one elongate flexible anchoring element in the form of a strip comprising a plurality of elongate anchoring portions transversely spaced apart from one another across the strip and joined by an elongate bridging portion disposed between the elongate anchoring portions and extending along the lengths of the anchoring portions so as to interconnect the elongate anchoring portions along the lengths, and the anchoring and bridging portions being configured such that each anchoring portion is placeable in a respective one of the said second grooves or channels;

inserting the second connection end of the second conduit section into the receiving recess of the first conduit section such as to bring into register or alignment the at least one first groove or channel and the plurality of second grooves or channels; and inserting the said elongate flexible anchoring element into the at least one first groove or channel and the plurality of second grooves or channels so as to be seated in and between both the said at least one first groove or channel and the plurality of second grooves or channels;

whereby following said insertion and seating of the anchoring element into and between the in-register or aligned at least one first groove or channel and the plurality of second grooves or channels, with the anchoring portions of the anchoring element seated in the said second grooves or channels, the first and second conduit sections are united so as to be axially substantially immovable relative to each other.

\* \* \* \* \*